United States Patent [19]
Daniels et al.

[11] Patent Number: 4,676,729
[45] Date of Patent: Jun. 30, 1987

[54] LIGHTWEIGHT ROOFING MODULE AND APPARATUS AND METHOD FOR MANUFACTURING SAME

[75] Inventors: Ronald Daniels, Portland, Oreg.; Robert B. Turpin, 588 NW. Queens Ct., Hillsboro, Oreg. 97124

[73] Assignee: Robert B. Turpin, Hillsboro, Oreg.

[21] Appl. No.: 824,714

[22] Filed: Jan. 31, 1986

[51] Int. Cl.⁴ .............................................. A01J 21/00
[52] U.S. Cl. .................................... 425/337; 425/383; 264/285; 156/461
[58] Field of Search ................ 156/461, 202; 264/285, 264/339; 425/335, 337, 383, 384

[56] References Cited

U.S. PATENT DOCUMENTS

| | | | |
|---|---|---|---|
| 3,012,603 | 12/1961 | Newsome et al. | 425/335 X |
| 3,695,801 | 10/1972 | Matsushita et al. | 425/383 X |
| 4,410,390 | 10/1983 | Farrell | 156/461 |
| 4,601,689 | 7/1986 | Finkle et al. | 264/339 X |

FOREIGN PATENT DOCUMENTS

| | | | |
|---|---|---|---|
| 0105926 | 8/1981 | Japan | 264/285 |
| 0638428 | 9/1983 | Switzerland | 264/285 |

OTHER PUBLICATIONS

Taber Instrument Corporation, "Thermocreaser for Speed-Creasing Sheet Plastics".

Primary Examiner—Charles Hart
Attorney, Agent, or Firm—Chernoff, Vilhauer, McClung & Stenzel

[57] ABSTRACT

The roofing module of the present invention is comprised of a sheet of thermoplastic material which has opposed side margins that are bent upwardly at 90° with respect to the body of the sheet to provide joinder tabs. The module is formed by transporting a flat sheet of the material between a pair of inwardly-facing radiant heaters which are focused on a line which the sheet will be bent about in order to soften the sheet along that line. After the sheet is softened along the fold line it is transported through a bending section comprised of a series of die rollers which cause the margin to progressively be bent upwardly to the desired orientation.

3 Claims, 5 Drawing Figures

LIGHTWEIGHT ROOFING MODULE AND APPARATUS AND METHOD FOR MANUFACTURING SAME

BACKGROUND AND SUMMARY OF THE INVENTION

The present invention relates to a roofing module and to a method and apparatus for making such a module.

There are many applications, such as greenhouses or tennis courts, in which it is desirable to utilize sheets of translucent lightweight plastic material for a roof. However, sealing such sheets against leakage has been difficult to accomplish. One sealing method which is both inexpensive and effective is to bend the opposed side margins of the sheet upwardly at 90° with respect to its body. A U-shaped cap is then installed over the upturned margins of adjacent sheets to join them together and prevent leakage through the resulting gap. This technique is shown, for example, in Rylander, U.S. Pat. No. 3,063,201.

A particularly desirable material for roofing modules of this type is the LEXAN sheet which is made by General Electric Company. The LEXAN sheet comprises top and bottom panels which are separated from one another and joined together by means of parallel ribs, thereby creating a series of elongate channels in the sheet. This material has an exceptionally high strength-to-weight ratio in comparison with other translucent or transparent materials and yet still transmits light to a high degree. Due to its channel configuration, however, LEXAN sheets are difficult to bend and therefore are not susceptible to the above-described system for joining panels.

The present invention provides a method and apparatus which will quickly and inexpensively bend the side margins of LEXAN sheets in order to utilize them as roofing modules. The apparatus comprises a frame having multiple sets of coplanar support rollers which support the sheet as it is being processed. A first set of the support rollers is located at spaced-apart locations across the width of the frame at its inlet end, and a second set is located at spaced-apart locations across the width of the frame at its exit end. In addition, sets of support rollers are located at spaced-apart locations along both sides of the frame below the side margins of the sheet being processed.

The sheet is transported across the frame on the support rollers by means of an endless conveyor belt which is located medially in the frame and which extends from the inlet end of the frame to approximately three-fourths of the way across its length. Top rollers, which are located above the conveyor at spaced intervals, are separated from the conveyor by approximately the thickness of the sheet. Thus the top rollers force the sheet into contact with the conveyor to ensure non-slip transportation.

Associated with each of the support rollers which support the side of the sheet that is being bent are indexing rollers whose axes are oriented normal to the axes of the support rollers in order to engage the edge of the sheet. A portion of the indexing rollers and the associated support rollers are mounted on a first indexing frame, and the remainder of the indexing rollers and their associated support rollers are mounted on a second indexing frame. The first and second indexing frames are movable, independent of one another, relative to the frame on screw rods which are grounded to the frame.

Associated with each of the support rollers that support the margin of the sheet that is not being bent are squaring rollers, which also are oriented perpendicular to the support rollers in order to contact the edge of the sheet. The squaring rollers and their associated support rollers are attached to a squaring frame which is mounted movable relative to the frame on screw rods.

Located beside the first indexing frame are radiant heaters which heat the top and bottom surfaces of the sheet as it is being transported through the apparatus. While either radiant or infrared heaters will work, they must emit enough energy to soften the plastic material of the sheet across its entire width sufficiently to allow the sheet to be bent.

Located downstream from the heaters, between the first and second indexing frames, is a bending section which is used to bend one margin of the sheet upwardly at a 90° angle with respect to the rest of the sheet. The bending section comprises a series of die support rollers which are coplanar with the remaining support rollers and are located inwardly adjacent to the line about which the sheet is to be bent. Located above a portion of the die support rollers are first die rollers, which are coplanar with the die support rollers and separated from them by approximately one sheet thickness. The first die roller which is contacted by the sheet first has a radially outwardly extending bead on its outer periphery which is forced into the soft heated plastic as the sheet is transported between the die support rollers and the first die rollers to create a trough in the sheet along the fold line.

Outwardly of the die support rollers are second die rollers which are rotatable on axes which are not parallel with one another. The second die roller which is located at the beginning end of the bending section has an axis which is parallel with the plane of the sheet, and the second die roller which is located at the finish end of the bending section has an axis which is perpendicular to the sheet. The orientation of the axes of the intermediate second die rollers vary progressively between these two extremes.

In addition to the previously described die rollers, the bending section has third die rollers which are mounted on axes that are perpendicular to the plane of the sheet. The third die rollers are located across from the last and next to the last second die rollers.

In operation, a sheet of material is fed into the inlet end of the apparatus where it is pinched between the conveyor and one of the top rollers. The conveyor then feeds the sheet past the heaters which heat its top and bottom surfaces along the line it is to be folded about. The sheet then is fed into the bending section where the bead on the leading first die roller forms a trough in the plastic which has been softened by the heaters. As the sheet continues through the bending section, the second die rollers cause the margin of the sheet to be bent upwardly along the trough, and the bent margin then is oriented at 90° with respect to the rest of the sheet between the third die rollers and the second die rollers which are located at the end of the bending section.

Once the entire sheet has passed through the apparatus it is turned around and passed through again to bend the other margin.

Accordingly, it is a principal object of the present invention to provide thermoplastic sheets, of the type that have a plurality of rectangular channels passing medially through them, having opposed side margins which are bent upwardly at 90° with respect to the body of the sheet.

It is a further object of the present invention to provide a method for bending the margins of such sheets at a 90° angle.

It is a still further object of the present invention to provide an apparatus for bending the margins of such sheets at a 90° angle.

It is a further object of the present invention to provide such an apparatus in which a margin is bent continuously as the sheet passes through the apparatus.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 4:
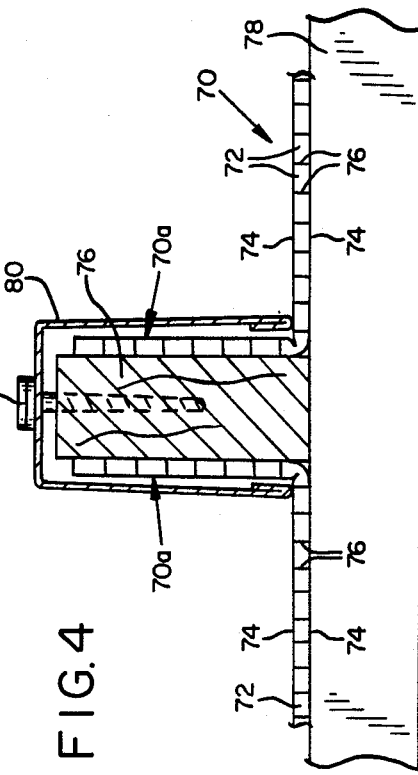
FIG. 4 is a fragmentary sectional view showing the installation of the roof panels of the present invention.
Figure 5:
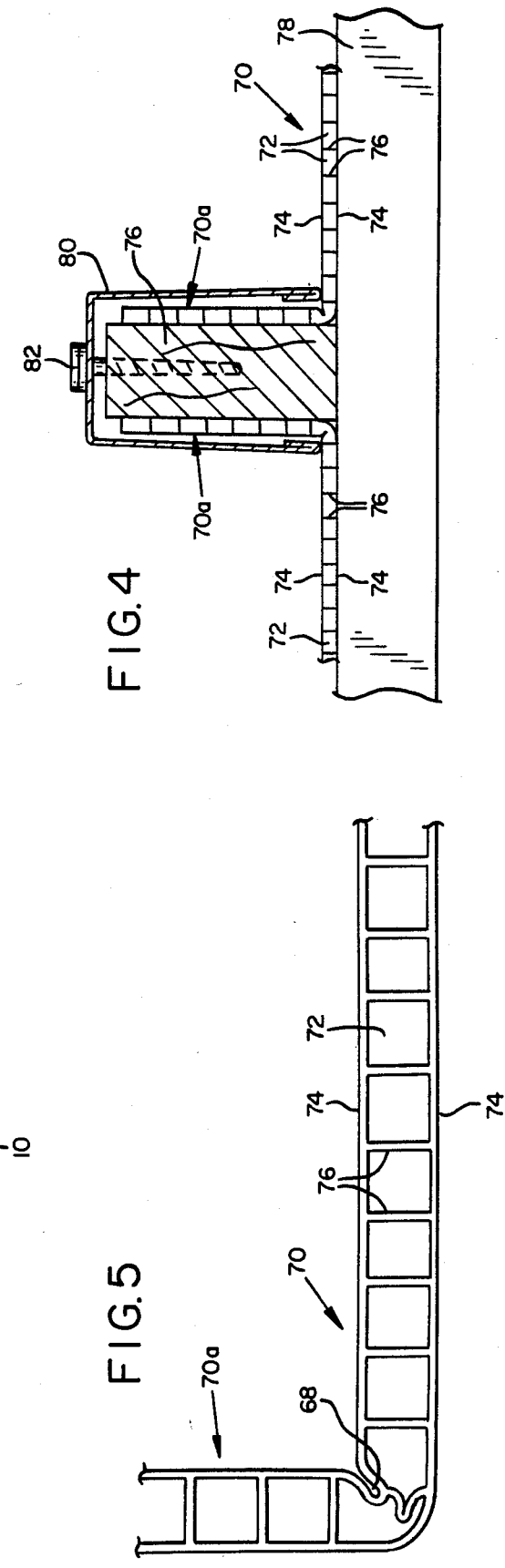
FIG. 5 is a fragmentary sectional view of the roof panel of the present invention.

Referring to FIGS. 4 and 5 of the drawings, the present invention relates to a module 70 which is used for constructing a roof. The module is made from sheets of thermoplastic material which have a plurality of rectangular channels 72 that are bounded by planar panels 74 on their tops and bottoms and by ribs 76 on their sides. The top and bottom panels 74 and ribs 76 are formed in an integral unit giving a structurally strong lightweight sheet. This material is commercially made by General Electric Company and is sold under the trademark LEXAN.

In the module of the present invention, the opposed side margins 70a of the sheets are bent upwardly at 90° with respect to the remainder of the sheet. Adjacent modules are interconnected to one another through these margins to form a complete structure. This can be accomplished, for example, by positioning the margins 70a of the adjacent modules alongside an elongate block 76 which is attached to the underlying roof structure 78, and placing a sealing cap 80 over them. The sealing cap 80 is secured to the block 76 by means such as nails 82.

Figure 1:
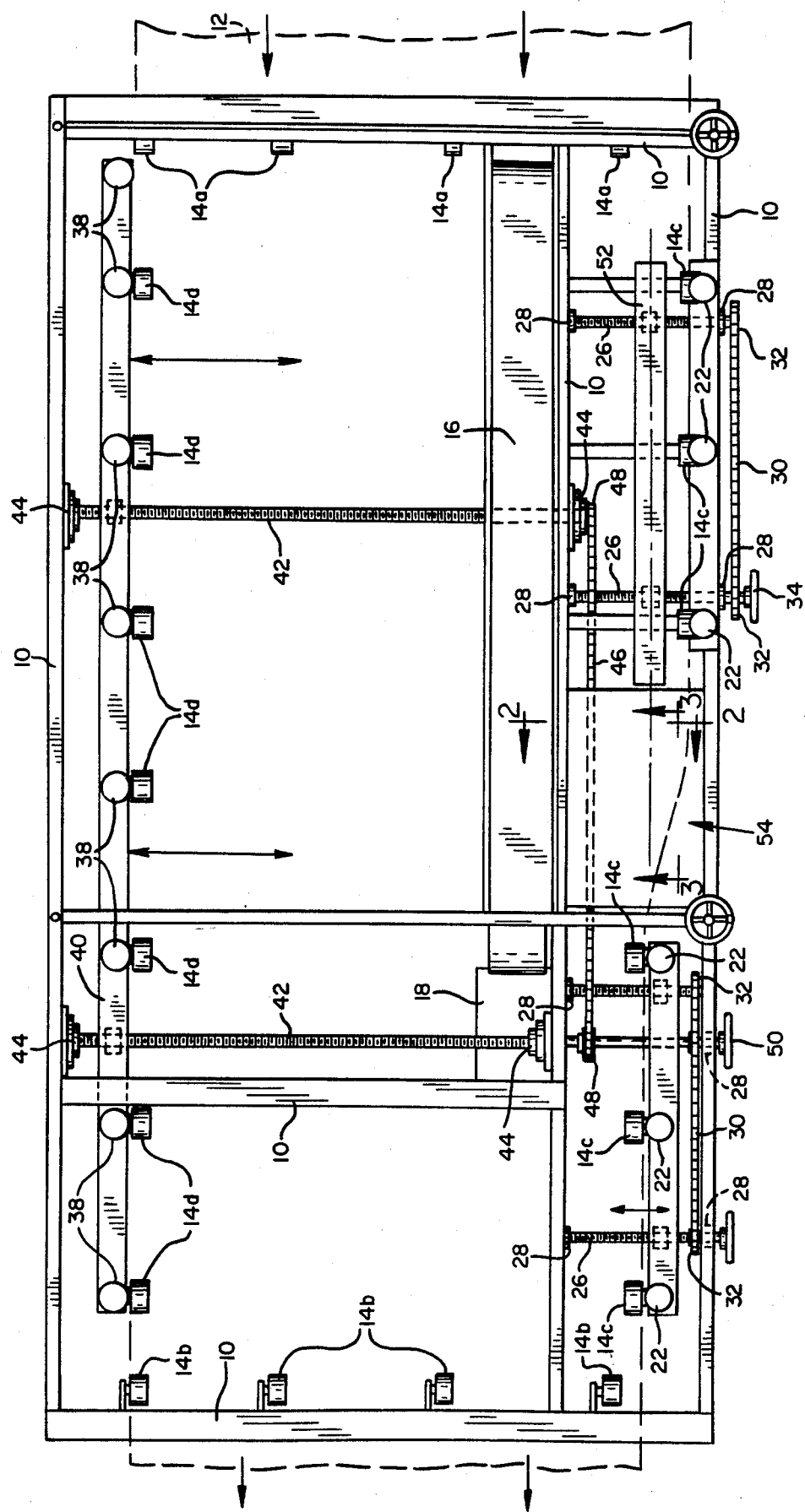
FIG. 1 is a plan view of a sheet-bending apparatus embodying the present invention.

Referring now to FIG. 1 of the drawings, the apparatus which is used to make the modules includes a frame 10 which supports the remaining elements of the apparatus. The frame must be at least as wide as the widest sheet of material 12 which will be processed by the apparatus, and long enough to accommodate the various elements which are necessary to bend the margin of the sheet.

The sheet is supported on the frame by a series of support rollers 14. A first set of support rollers 14a, in which the rollers are located at spaced intervals along the inlet end of the frame, supports the sheet 12 across its entire width as it enters onto the apparatus. A second set of the support rollers 14b has rollers which are located at spaced-apart intervals at the opposite or exit end of the frame to support the sheet across its entire width as it exits the apparatus. A third set of support rollers 14c supports the sheet along the margin which is to be bent, and a fourth set of support rollers 14d supports the sheet along the margin that is not being bent.

Figure 2:
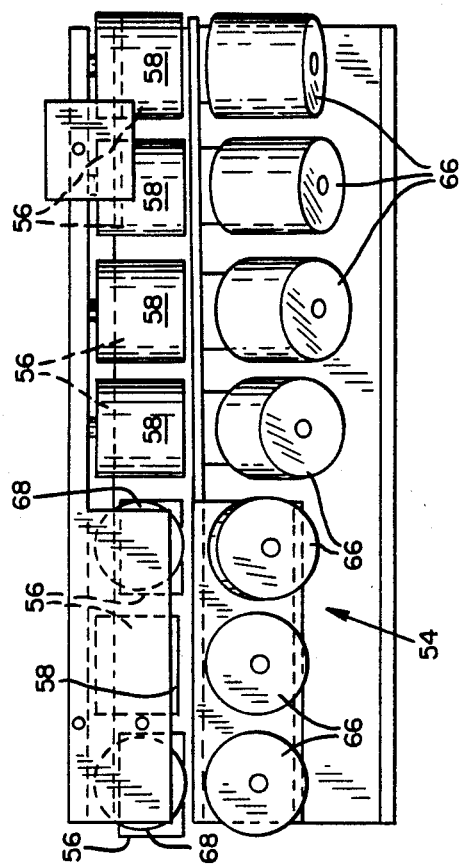
FIG. 2 is a sectional view, at an enlarged scale, taken along the line 2—2 in FIG. 1.

Located medially in the frame 10 is an endless conveyor 16 which is driven by a variable speed motor 18. The conveyor 16 extends from the inlet end of the frame over roughly two-thirds of its length and transports the sheet of material which is being supported by the rollers between the inlet and exit ends of the frame. Free rotating top rollers 20, FIG. 2, having the same width as the belt 16, are located above the belt at several positions to urge the sheet into contact with the belt thereby ensuring that there is no slipage.

Located at spaced intervals along the side of the frame at which the sheet is being bent are a series of indexing rollers 22 which contact the edge of the sheet. A portion of the indexing rollers and a portion of the third set of support rollers are mounted on a first indexing frame 24 in mating pairs. The first indexing frame is mounted on two screw rods 26 which are rotatably journaled to the frame by means of pillow blocks 28. The screw rods 26 are rotatably interconnected by means of a chain 30 and sprockets 32. Thus, rotating a handle 34 attached to one of the screw rods causes the first indexing frame to be moved transversely with respect to the frame. The remainder of the third rollers 14d and the indexing rollers 22 are mounted in mating pairs on a second indexing frame 36 which also is movable with respect to the frame by means of screw assemblies which are the same as the screw assemblies associated with the first indexing frame.

Located along the opposite side of the frame at spaced intervals are a series of squaring rollers 38 which rotatably contact the edge of the sheet which is not being bent. The squaring rollers 38 and the fourth set of support rollers 14d are mounted on a squaring frame 40 in mating pairs. Similar to the indexing frames, the squaring frame is mounted on two screw rods 42 which are rotatably attached to the frame 10 through pillow blocks 44. The two screw rods are rotatably interconnected through a chain 46 and sprockets 48, and a handle 50 on one of the screw rods 42 facilitates its being rotated. Thus, like the indexing frames, the squaring frame can be moved transversely relative to the frame 10.

The sheet is heated along the line about which it will be bent by means of radiant heaters 52. Preferably there are two heaters, one which is located above the sheet and one which is located below the sheet. The heaters must heat the sheet along a considerable extent of the bend line in order to raise the temperature of the sheet sufficiently to allow it to be bent, and still not cause local melting. In addition, the heat must be concentrated on the bend line in order to achieve a straight bend. This can be accomplished by using elongate resistance elements whose output is focused by parabolic reflectors or by using elongate infrared heaters which are more efficient and by their very nature self-concentrating. Preferably, controls (not shown) are provided to vary the amount of energy being radiated by the heaters in order to control the degree of heating.

Figure 3:
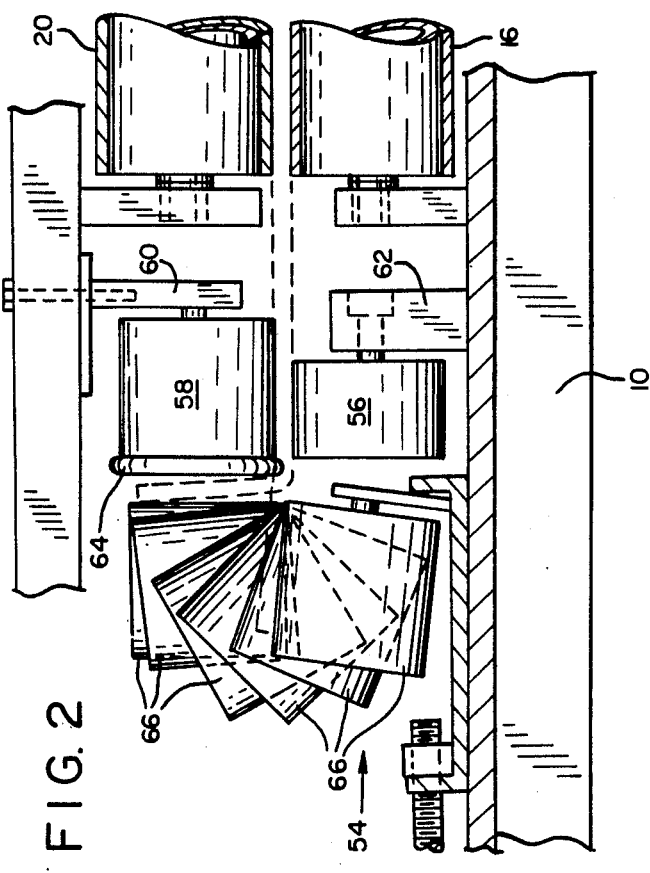
FIG. 3 is a sectional view, at an enlarged scale, taken along the line 3—3 in FIG. 1.

Located immediately downstream of the heaters, between the first and second heating frames, is a bending section 54 which bends the margin 10a of the sheet lying outwardly of the line which has been heated upwardly at a 90° angle with respect to the body of the sheet as the sheet is being transported through the apparatus. The bending section, FIGS. 2 and 3, comprises a series of die support rollers 56 which are located coplanar with the support rollers 14 immediately inwardly of the line on the sheet which has been heated by the heaters 52. The die support rollers 56 are located across the entire extent of the bending section and support the sheet inwardly of the bend through the entire bending procedure.

Located above some, but not all, of the die support rollers 56 are first die rollers 58 which are rotatable about axes which are parallel to the axes of the die support rollers. Thus, their axes are parallel to the plane of the sheet and are perpendicular to the direction it is being transported through the apparatus. The first die rollers are separated from the die support rollers by a distance which is approximately equal to the width of the sheet being processed. Accordingly, the bracket 60 which carries the first die rollers 58 is adjustable vertically with respect to the bracket 62 which carries the die support rollers 56, although, well-known mechanisms can be used for this purpose and thus are not illustrated in the drawings. Located on the inner edge of the first die roller 58 which is first contacted by the sheet as it is being transported through the apparatus is a radially outwardly extending bead 64 which forms a trough along the fold line in the heated sheet. Thus, the sheet is more easily bent along the fold line as it passes through the remainder of the bending section.

Located outwardly of each die support roller 56 is a second die roller 66. Rather than having uniformly aligned rotational axes, as is the case with the die support rollers 56 and the first die rollers 58, the axis of each second die roller is aligned differently than the axis of every other second die roller. The axis of the second die roller which is first contacted by the sheet 12 is substantially parallel with the sheet and the axis of the second die roller which is last contacted by the sheet is substantially perpendicular to the sheet. The axes of the intermediate second die rollers sequentially vary between these two extremes.

The final elements of the bending section are third die rollers 68 which have axes that are perpendicular to the plane of the sheet and are located across from the last and next to the last second die rollers 66. The third die rollers in effect replace the first die rollers 58 in these two positions.

While the rollers in the bending section can be made from any hard, wear-resistance material, it has been found that a low thermally conductive metallic material is preferable, particularly for the first and second die rollers. If metallic rollers are used, however, it is important that their edges be rounded and that they have an extremely smooth finish in order to avoid marring or scratching of the plastic sheet which is being processed.

The apparatus of the present invention is used by feeding an unformed plastic sheet 12 into the first set of support rollers 14a at the inlet end of the apparatus. The sheet is squeezed between the conveyors 16 and the first of the top rollers 20 and the conveyor then starts it moving along the frame with its edges supported by the second and third support rollers 14c and d, respectively. Prior to insertion of the sheet into the apparatus, the squaring frame 40 is positioned relative to the first indexing frame so that the squaring rollers 38 urge the sheet into contact with the indexing rollers 22 thereby causing it to be square with respect to the frame as it is being transported. The first indexing frame also is adjusted relative to the heaters 52 to separate the edge of the sheet, which is in contact with the indexing rollers 38, from the center line of the heater by a distance which is equal to the margin that is to be formed in the sheet. Thus as the sheet passes under the heaters 52 it is heated along the line which is to be bent.

As the leading edge of the sheet leaves the heaters it immediately passes into the bending section where the bead 64 in the front first die roller 58 deflects the soft heated plastic to form a trough along the line which the margin of the sheet is to be bent at. As the sheet progresses through the bending section 54, the second die rollers 66 causes the margin to be bent upwardly along this trough until the final second die roller and the final third die roller combine to position the margin at a 90° angle with respect to the remainder of the sheet. During this bending process that portion of the sheet immediately inwardly of the fold line is maintained planar with the remainder of the sheet due to its being clamped between the die support rollers 56 and the first die rollers 58.

After the first margin has been bent, the sheet is turned around and passed through the apparatus again to bend the opposite margin.

The output of the heaters 52 and the speed of the motor 18 must be adjusted to achieve proper bending with a sheet having a particular thickness, and appropriate instrumentation, well-known in the prior art, could be provided to allow these settings to be duplicated once initially established.

Rather than using the apparatus of the present invention to bend the margins of a sheet of material, the sheet can be provided with elongate grooves 68, FIG. 5, which allow the margins to be bent by hand upon light heating. The groves 68 could be formed by running a raised bead, such as bead 64, in a forming wheel along the fold line after it has been heated by a radiant heater similar to heaters 52.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An apparatus for bending one side margin of a sheet of thermoplastic material at a 90° angle with respect to the body of the sheet as the sheet is being transported along a support frame comprising:
    (a) a plurality of die support rollers which are arranged for rotatably supporting the sheet immediately inwardly of a fold line about which the sheet will be bent as the sheet is being transported;
    (b) a plurality of first die rollers which are rotatable on axes which are normal to the plane of the sheet and perpendicular to the direction it is being transported, said first die rollers being located above said die support rollers and being separated therefrom by a distance which is equal to the width of the sheet being bent, and said first die rollers having outer edges which are coplanar with said fold line;
    (c) a plurality of second die rollers associated with said first die rollers and located on the other side of said fold line therefrom, the axis of the second die roller which first is contacted by the sheet as it is transported being substantially parallel to the plane of the sheet, the axis of the second die roller which last is contacted by the sheet as it is transported being substantially normal to the plane of the sheet and the axes of the intermediate second die rollers varying progressively therebetween;

(d) a plurality of third die rollers which are rotatably mounted on axes which are normal to the plane of the sheet, said third die rollers being located adjacent to those second die rollers which are normal or nearly normal to the plane of the sheet, on the other side of the fold line therefrom;

(e) means for heating the sheet along said fold line before it is transported between said die support rollers and said first die rollers.

2. The apparatus of claim 1 wherein the first die roller which contacts the sheet has a radially outwardly protruding bead on said outer edge.

3. The apparatus of claim 1, including a support table upon which said second die rollers are mounted and means for adjusting the location of said support table on said frame so as to vary the spacing between said second die rollers and said first and third die rollers.

* * * * *

UNITED STATES PATENT AND TRADEMARK OFFICE
CERTIFICATE OF CORRECTION

PATENT NO. : 4,676,729

DATED : June 30, 1987

INVENTOR(S) : Ronald Daniels, Robert B. Turpin

It is certified that error appears in the above-identified patent and that said Letters Patent is hereby corrected as shown below:

On the title page
Change the Assignee from "Robert B. Turpin" to --Ronald Daniels--.

Col. 5, Line 46      Change "rollers" to --rollers--.

Col. 6, Line 35      Change "groves" to --grooves--.

Signed and Sealed this

Eighth Day of December, 1987

Attest:

DONALD J. QUIGG

Attesting Officer

Commissioner of Patents and Trademarks